(12) United States Patent
Abel et al.

(10) Patent No.: US 6,803,574 B2
(45) Date of Patent: Oct. 12, 2004

(54) NIGHT VISION DEVICE FOR VEHICLES

(75) Inventors: Bjoern Abel, Bad Salzuflen (DE); Michael Burg, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 70 days.

(21) Appl. No.: 10/252,594

(22) Filed: Sep. 24, 2002

(65) Prior Publication Data

US 2003/0066965 A1 Apr. 10, 2003

(30) Foreign Application Priority Data

Sep. 24, 2001 (DE) .......................................... 101 46 959

(51) Int. Cl.[7] .............................................. H01J 40/14
(52) U.S. Cl. ...................................... 250/330; 250/332
(58) Field of Search ................................ 250/330, 332, 250/334, 353, 339.04, 339.14, 339.15, 341.8, 342; 356/815, 851, 859; 348/148, 164

(56) References Cited

U.S. PATENT DOCUMENTS

| | | | | |
|---|---|---|---|---|
| 5,013,917 A | * | 5/1991 | Ulich | 250/330 |
| 5,619,036 A | * | 4/1997 | Salvio et al. | 250/330 |
| 5,623,146 A | * | 4/1997 | Jones et al. | 250/334 |
| 5,729,016 A | * | 3/1998 | Klapper et al. | 250/334 |
| 5,909,244 A | * | 6/1999 | Waxman et al. | 348/222.1 |
| 5,973,315 A | * | 10/1999 | Saldana et al. | 250/214 VT |
| 6,072,565 A | * | 6/2000 | Porter | 356/5.04 |
| 6,420,704 B1 | * | 7/2002 | Berenz et al. | 250/330 |
| 6,665,063 B2 | * | 12/2003 | Jamieson et al. | 356/141.1 |
| 6,672,745 B1 | * | 1/2004 | Bauer et al. | 362/545 |
| 2003/0230705 A1 | * | 12/2003 | Stephan et al. | 250/214 VT |

FOREIGN PATENT DOCUMENTS

| | | |
|---|---|---|
| DE | 40 07 646 A1 | 9/1991 |
| DE | 100 62 783 A1 | 6/2002 |
| EP | 0 479 634 B1 | 9/1991 |

* cited by examiner

Primary Examiner—Constantine Hannaher
Assistant Examiner—Otilia Gabor
(74) Attorney, Agent, or Firm—Birch, Stewart, Kolasch & Birch, LLP

(57) ABSTRACT

A night vision device and method for vehicles is provided, including a radiation device for generating infrared radiation, a detection device for receiving an infrared image, wherein the detection device works together with the radiation device, and a display device for visual display of the infrared image for the vehicle driver, wherein the radiation device has a semiconductor radiation source that can be controlled such that the infrared radiation is emitted in a discrete-time fashion.

21 Claims, 2 Drawing Sheets

NIGHT VISION DEVICE FOR VEHICLES

This non-provisional application claims priority under 35 U.S.C. §119(a) on Patent Application No. DE 101 46 959.4 filed in Germany on Sep. 24, 2001, which is herein incorporated by reference.

BACKGROUND OF THE INVENTION

1. Field of the Invention

The invention relates to a night vision device and method for vehicles, the night vision device including a radiation device for generating infrared radiation, a detection device for receiving an infrared image, wherein the detection device works together with the radiation device, and a display device for visual display of the infrared image for the vehicle driver.

2. Description of the Background Art

Known from EP 0 479 634 B1 is a radiation device consisting of a light source that has a broadband spectrum and radiates in the visible and near infrared spectral region. A night vision device for vehicles is based on a headlight system. A filter is placed in front of a light source of the headlight in the direction of light emission, and in an operating position that intercepts the light beam, which has the effect that only the infrared portion of the light beam is transmitted and radiated in the direction of a visual field located in front of the vehicle. A resulting infrared image of the visual field in front of the vehicle can be received by a detection device, that is preferably embodied as a CCD camera, is further processed, and visually displayed by means of a suitable subsequent display device, preferably arranged in the region of the windshield. In this way the driver can be provided with an expanded visual field whose depth is greater than the visual field generated by the light source in the visible region.

A disadvantage of the known night vision device is that, in addition to the light source, a filter is required that filters out the infrared radiation for transmission in the direction of the visual field. The use of light-emitting diodes with a narrow spectral range is known as an alternative, so that additional filtering is not required. Such known light-emitting diodes are customarily operated continuously with constant emitted power.

SUMMARY OF THE INVENTION

It is therefore an object of the present invention to further develop a night vision device for vehicles such that the effectiveness of the radiation emission is improved.

To attain this object, the night vision device has a semiconductor radiation source in the radiation device that can be controlled such that the infrared radiation is emitted in a discrete-time fashion.

The special advantage of the invention is that the discrete-time behavior of the radiated signal makes possible a temporal weighting of the radiated power. This temporal weighting achieves a temporal concentration of the maximum radiated power, so that a reduction of the average radiated power occurs in spite of a relatively high maximum radiated power. This advantageously results in a higher peak radiated power that can be used to generate the infrared image in comparison to continuous operation. On the other hand, it results in a significant reduction in the average radiated power, so that the health hazard resulting from radiation in the eye can be reduced for persons coming toward the vehicle.

In accordance with a particular embodiment of the invention, the semiconductor radiation source can be controlled such that the infrared radiation is emitted in the form of a periodic pulse of radiation. It is advantageous for the radiating device to operate in a pulsed mode, which is easy to accomplish by appropriate control of the semiconductor radiation source.

In a further embodiment of the invention, the pulse width of the radiation pulse is less than $\frac{1}{10}$ of the cycle time, so that the radiated energy emitted is concentrated into a relatively short time interval. In an advantageous manner, the average radiated power can be significantly reduced in this way, however, this does not entail any degradation of the quality of the infrared image.

In accordance with a further embodiment of the invention, the semiconductor radiation source can be controlled synchronously with the detection device, so that detection of the radiation emission can only take place during the time interval of the radiation emission.

In accordance with a further embodiment of the invention, an additional infrared sensor is provided that receives the infrared radiation from an oncoming vehicle. As a function of the presence of such an infrared radiation signal, the operation of both the semiconductor radiation source and the detection device can be modified in such a way that the next radiation pulse can be emitted and detected with a temporal offset. In this way, the radiated infrared signal transmitted from the oncoming vehicle can be prevented from interfering with or altering the measurement result of the detection device.

In accordance with a further embodiment of the invention, the pulse pattern transmitted by the semiconductor radiation source can be altered as a function of the presence of an infrared radiation signal from an oncoming vehicle. For example, the infrared sensor that detects the infrared radiation from the oncoming vehicle can be connected to a control unit that analyzes the pulse pattern of the oncoming vehicle and changes the pulse pattern of the semiconductor radiation source as a function thereof so that no mutual interference can arise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
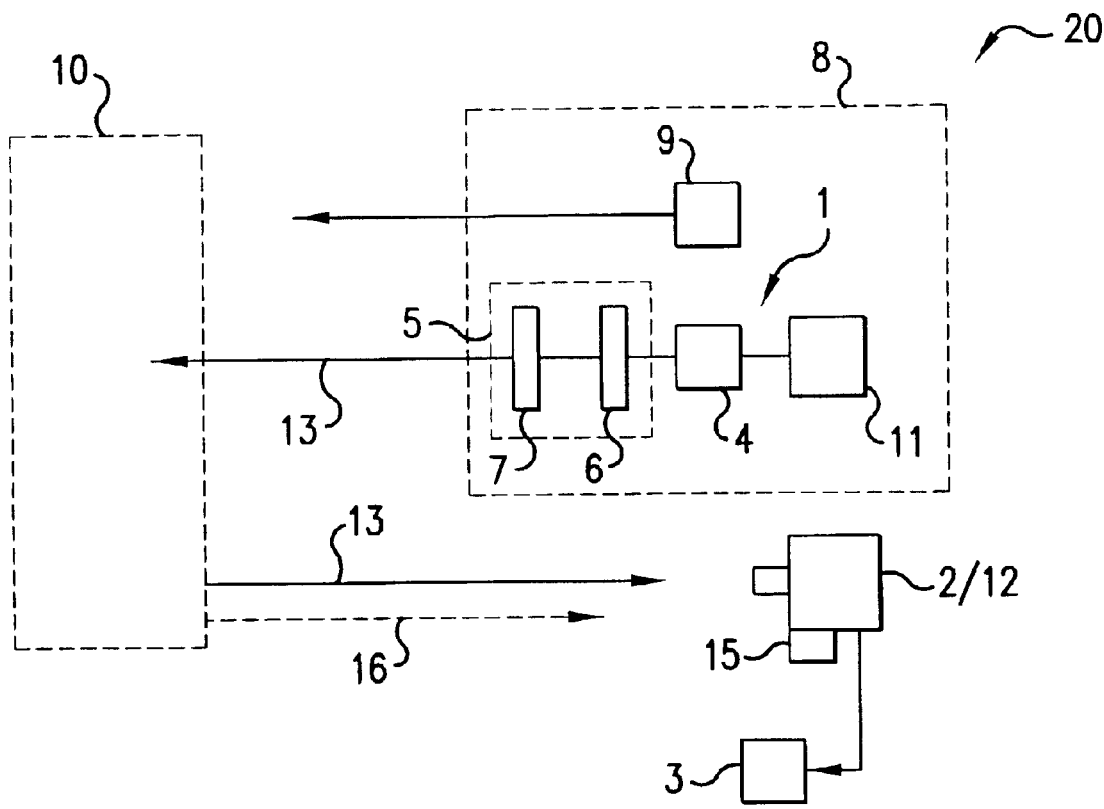
FIG. 1 is a schematic block diagram of a night vision device.

A night vision device 20 is shown in FIG. 1 and comprises a radiation device 1, a detection device 2, and a display device 3.

The radiation device 1 comprises a semiconductor radiation source 4, which can be embodied as an infrared diode (IRED) or as an infrared laser diode (IR laser diode). The radiation device 1 also includes an optic collector 5, which comprises a Fresnel lens 6 for focusing the radiation beam transmitted by the semiconductor radiation source 4 and a bifocal lens 7 that performs further focusing and horizontal elongation to form a desired radiation distribution. The semiconductor radiation source 4 preferably has a plurality of infrared diodes arranged on a common carrier (not shown). In this way, the radiation source 4 has a compact construction.

The radiation device 1 is integrated into a headlight 8 that has an additional light source 9 for generating a visible beam of light. The light source 9 can be used to perform a lighting function, in particular that of a low-beam and/or high-beam headlight. The light source 9 thus serves to illuminate a visual field 10 in front of the vehicle.

The night vision device 20 can be additionally switched on to enlarge the visual field 10, in particular so that the depth of the visual field 10 is extended. For this purpose, a control unit 11 is provided that synchronously operates both the semiconductor radiation source 4 and a camera 12 of the detection device 2. The camera 12, such as a CCD camera, can be located at a distant location from the headlight 8.

Figure 2:
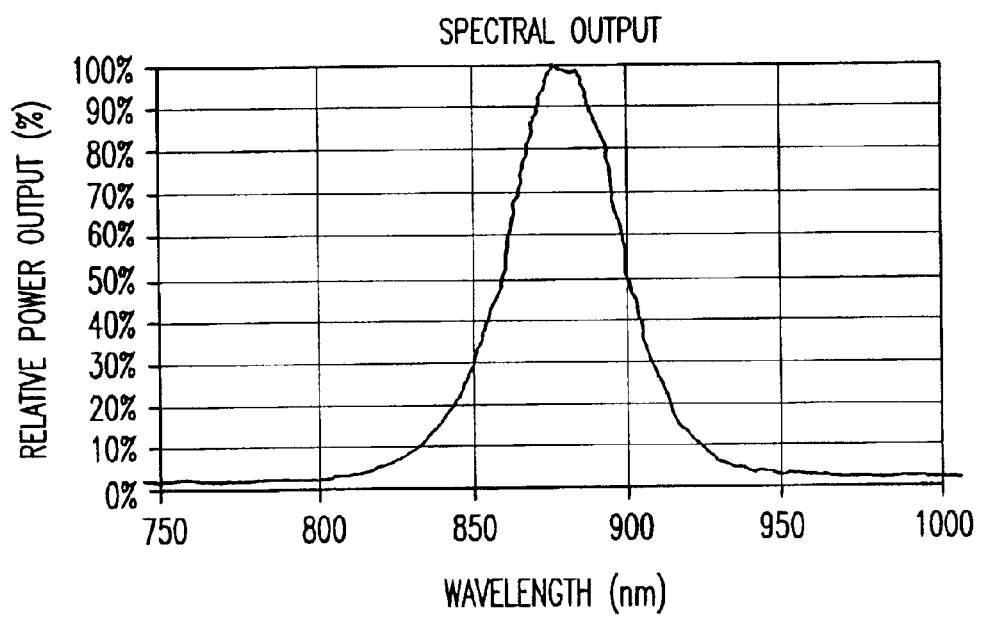
FIG. 2 is a spectral output of the semiconductor radiation source.

As can be seen from FIG. 2, the semiconductor radiation source 4 is designed such that it emits radiation in a wavelength range between 800 nm and 950 nm. The maximum value of radiated power is located approximately in the range of 870 to 880 nm. Alternatively, semiconductor radiation sources 4 can be used, whose maximum radiated power is in the range of 800 to 950 nm.

Figure 3:
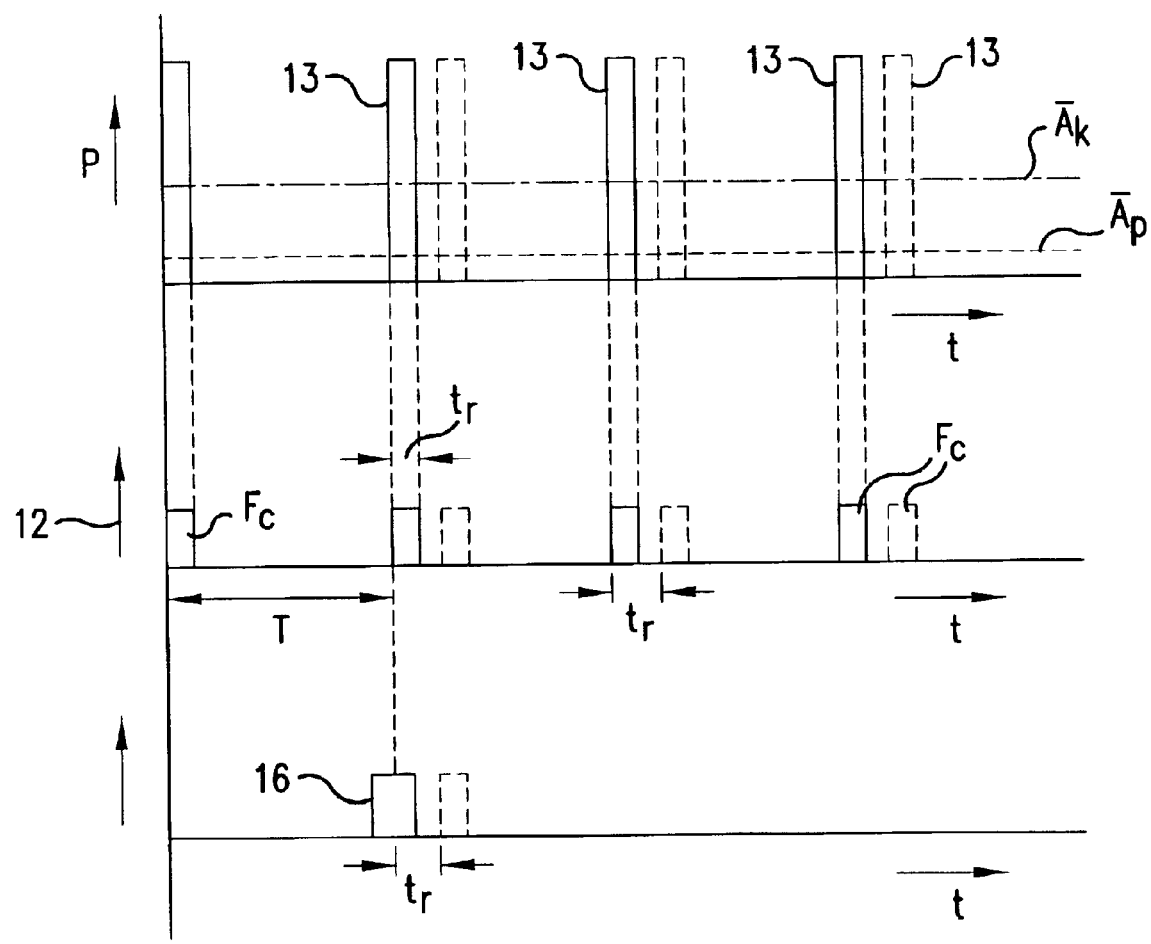
FIG. 3 is a pulse diagram.

FIG. 3 shows that the semiconductor radiation source 4 emits the infrared radiation in the form of periodic radiation pulses 13. The control unit 11 controls the radiation pulses 13 with a frequency in the range between 20 to 200 Hz. The radiation pulses are controlled in a discrete-time fashion, more particularly in a pulsed mode of operation. Referring to the upper timing diagram of FIG. 3, the power P is shown as a function of time t. The ratio of the pulse width $t_p$ to the period T is in a range of 1 to 20. The pulse width can be in a range between 100 $\mu$s and 10,000 $\mu$s. Consequently, the average radiated power $\overline{A}_p$ in pulsed operation is significantly lower than the average radiated power $\overline{A}_k$ in continuous operation. In the present example embodiment, the average radiated power in continuous operation is ten times the average radiated power $\overline{A}_p$ in pulsed operation.

Since the camera 12 is operated synchronously with this pulse time $t_p$ by means of a control signal $F_c$, detection takes place with a significantly higher radiated power. The quality of the measurement result is thus improved. At the same time, the exposure to radiation for the driver of an oncoming vehicle can be reduced, since the average radiated power $\overline{A}_p$ is significantly reduced. The middle timing diagram in FIG. 3 shows the operation of the camera 12 with a control signal $F_c$ over the time t. The exposure time of the camera 12 is limited to the pulse time $t_p$.

The camera 12, such as a CCD or CMOS camera, can detect infrared radiation 14 from the visual field 10 to form an infrared image that is displayed to the driver of the vehicle in the display device 3. The display device 3 can, for example, be integrated in the windshield of the vehicle.

An infrared sensor 15 can be arranged in the vicinity of the camera 12 or can be integrated into the camera 12, so that an interfering radiated signal 16 from an oncoming vehicle in the visual field 10 can be detected. The interfering radiated signal 16, which has an interfering effect on the measurement result, is detected by the infrared sensor 15 and transmitted to the control unit 11. A phase shift in the sequence of radiation pulses 13 takes place as a reaction to this interfering signal 16, so that the next radiation pulse 13 (see pulses shown as dashed lines) is not triggered until the interfering infrared signal 16 has ended. The subsequent radiation pulses 13 are then controlled one after another in accordance with the period T. In this way, the simultaneous radiation of the radiation pulse 13 and the interfering radiated signal 16 is prevented. The bottom timing diagram in FIG. 3 shows the occurrence of the interfering radiated signal 16 over the time t.

Alternatively, the radiation pulse 13 that follows the interfering radiated signal can be temporally shifted a single time. Alternatively, the pulse width, pulse height, or pulse frequency of the series of radiation pulses 13 can also be altered. When multiple interfering radiation signals 16, which follow one another within short periods of time, are present, the pulse pattern of the interfering radiation signals 16 can be detected, and as a reaction thereto a pattern of radiation pulses 13 can be generated such that no simultaneous radiation of the radiation pulse 13 and of the interfering radiated signal 16 occurs.

As can be seen from FIG. 3, the occurrence of the interfering radiated signal 16 causes a temporal shift $t_v$ of the next radiation pulse 13, where the subsequent radiation pulses 13 are generated with the predetermined constant frequency. As a result of the synchronous operation of the camera 12, the exposure interval thereof also shifts by the delay time $t_v$. This advantageously results in a suppression of interference from an interfering radiated signal 16.

The invention is not limited to the present example embodiment. The infrared radiation emitted by the semiconductor radiation source 4 can also have a different profile. The important factor is that an increase in the transmitted infrared radiation takes place that is synchronous with an exposure time of a camera 12. By means of this temporary increase in the transmitted radiation, the negative effects of interference sources can be advantageously reduced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A night vision device for a vehicle comprising:
    a radiation device for generating infrared radiation;
    a detection device for receiving an infrared image, wherein the detection device works together with the radiation device; and
    a display device for visually displaying the infrared image to the vehicle driver, wherein the radiation device has a semiconductor radiation source that can be controlled such that the infrared radiation is emitted in a discrete-time fashion.

2. The night vision device according to claim 1, wherein the semiconductor radiation source can be controlled such that the infrared radiation is radiated in the form of a periodic radiation pulse.

3. The night vision device according to claim 2, wherein the pulse width of the periodic radiation pulse is less than 1/10 of the period, and wherein the average radiated power is approximately 1/10 of the average radiated power in continuous operation.

4. The night vision device according to claim 2, wherein the semiconductor radiation source is controlled in such a manner that the periodic radiation pulse is emitted with a constant frequency in a range between 20 and 200 Hz.

5. The night vision device according to claim 2, wherein an infrared sensor is provided to detect an interfering radiated signal generated by an oncoming vehicle, and in that as a function of the interfering radiated signal the semiconductor radiation source is controlled in such a manner that a temporal shifting of the periodic radiation pulses occurs.

6. The night vision device according to claim 5, wherein a pulse pattern, a pulse width, a pulse height, or a pulse frequency of the periodic radiation pulse is altered as a function of the presence of the interfering radiated signal from the oncoming vehicle.

7. The night vision device according to claim 2, wherein the pulse width of the periodic radiation pulse is less than $\frac{1}{20}$ of the period, and wherein the average radiated power is approximately $\frac{1}{10}$ of the average radiated power in continuous operation.

8. The night vision device according to claim 1, wherein the semiconductor radiation source and the detection device are operated synchronously such that the detection device detects the infrared image of a visual field in front of the vehicle, simultaneously with the radiation of the radiation pulses.

9. The night vision device according to claim 1, wherein the semiconductor radiation source is integrated into a headlight that has at least one light source for performing a lighting function.

10. The night vision device according to claim 1, wherein the semiconductor radiation source comprises one or more infrared laser diodes.

11. The night vision device according to claim 10, wherein the semiconductor radiation source comprises one or more infrared diodes.

12. The night vision device according to claim 1, wherein an optic collector is arranged in front of the semiconductor radiation source.

13. The night vision device according to claim 12, wherein the optic collector comprises a fresnel lens and a bifocal lens for focusing the infrared radiation to form a desired radiation distribution.

14. The night vision device according to claim 1, wherein the detection device is a camera.

15. A method for displaying an infrared image to a vehicle driver, said method steps comprising:

generating infrared radiation from a radiation device;

receiving an infrared image in a detection device, wherein the detection device operates in conjunction with the radiation device; and displaying the infrared image to the vehicle driver, wherein the radiation device has a semiconductor radiation source that can be controlled such that the infrared radiation is emitted in a discrete-time fashion.

16. The method of claim 15, further comprising the steps of:

controlling the semiconductor radiation source to radiate the infrared radiation in a form of a periodic radiation pulse.

17. The method of claim 15, further comprising the steps of:

operating said radiation device and said detection device synchronously, such that the detection device detects the infrared image of a visual field in front of the vehicle simultaneously with the radiation of the radiation pulses.

18. The method of claim 15, further comprising the steps of:

detecting an interfering radiated signal, which is generated by an oncoming vehicle, by an infrared sensor; and shifting a periodic radiation pulse of the infrared radiation generated by the radiation device, as a function of the detected interfering radiated signal.

19. A vehicle headlight having an integrated night vision device, said vehicle headlight comprising:

a light source for illuminating a visual field in front of a vehicle;

a semiconductor radiation source for generating infrared radiation in a discrete-time fashion;

an optic collector for focusing the infrared radiation to form a desired radiation distribution; and a control unit for synchronously operating the semiconductor radiation source and a detector in a periodic pulse, wherein the control unit modifies the periodic pulse such that an interfering infrared radiation generated by an oncoming vehicle will have a different and non-interfering periodic pulse.

20. The vehicle headlight according to claim 19, wherein the semiconductor radiation source comprises one or more infrared laser diodes.

21. The vehicle headlight according to claim 19, wherein the optic collector is arranged in front of the semiconductor radiation source in the direction of the desired radiation distribution.

* * * * *